Patented Oct. 18, 1927.

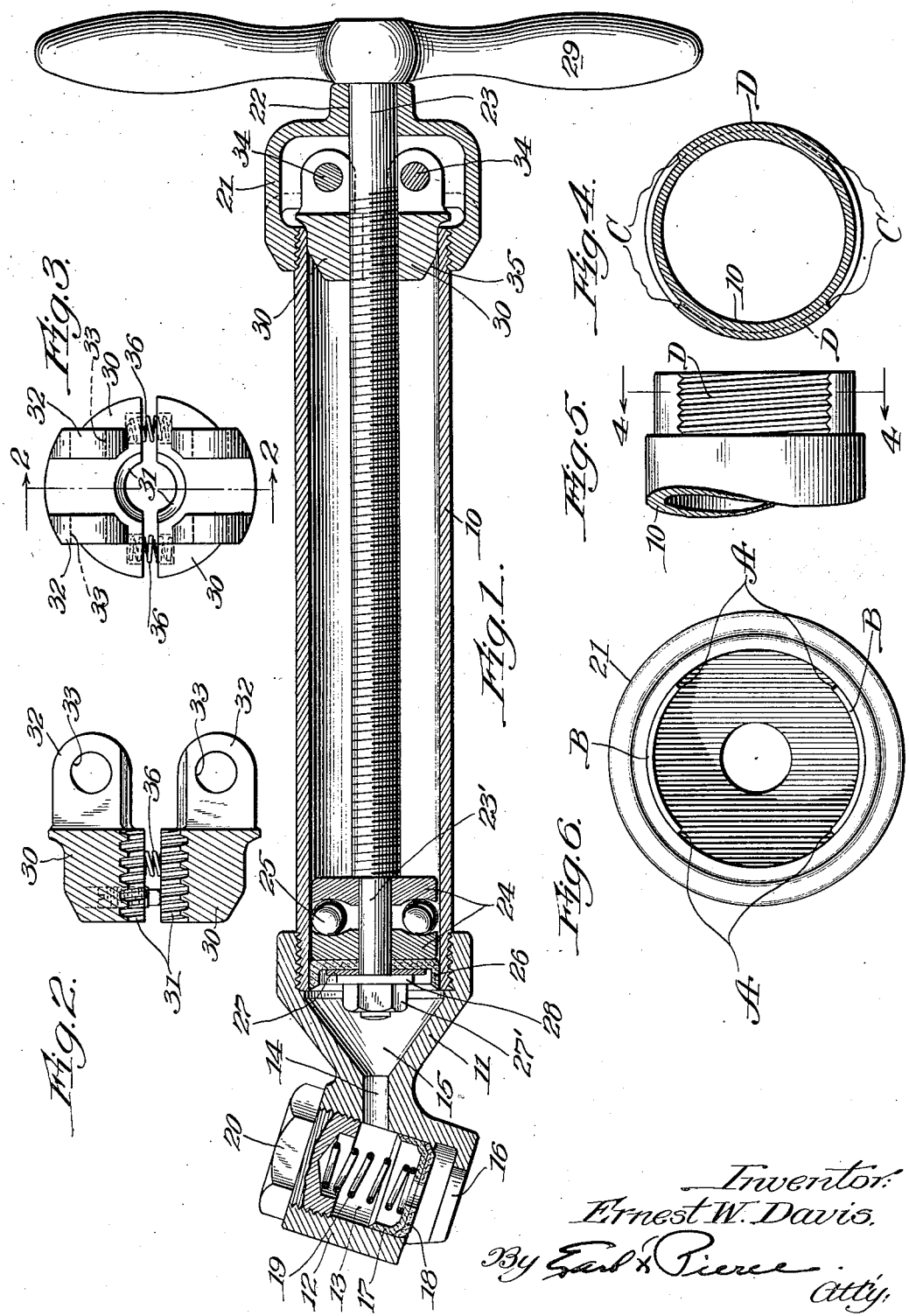

1,645,898

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed June 16, 1924. Serial No. 720,467.

My invention relates to improvements in lubricant compressors, and is particularly concerned with, though not limited to, the provision of a novel type of lubricant compressor for delivering, under comparatively high pressures and in comparatively large quantities, lubricant of the character used for lubricating the bearings for the crank pins and connecting rod pins of locomotives. This lubricant is almost a solid, being approximately of the same consistency as ordinary laundry soap, and requires considerable pressure for ejecting it from a compressor, and additional pressure for forcing it into the bearings to be lubricated.

A single lubrication of a locomotive requires a considerable quantity of this lubricant, and if a compressor is made large enough to hold a sufficient quantity of lubricant completely to lubricate a locomotive, difficulty is experienced in obtaining sufficient pressure upon the lubricant. If the compressor is made smaller in diameter so as to make it possible easily to exert the necessary pressure upon the lubricant, the length of time consumed in refilling the compressor is objectionable.

The objects of my present invention are,

First, to provide a compressor of the character described of such construction that pressures sufficiently high for the purpose intended may be easily and quickly produced;

Second, to provide a compressor, such as described, which can be easily and quickly reloaded or refilled, and Third, to provide a compressor which is simple in construction, economical to manufacture, and easy to operate.

Other objects of my invention will appear as this description progresses, reference being had to the accompanying drawings, in which Figure 1 is a central longitudinal section through a lubricant compressor embodying my invention;

Figure 2 is an enlarged sectional detail taken on line 2—2 of Figure 3;

Figure 3 is an end view of the split nut forming a part of my compressor;

Figure 4 is a section taken on line 4—4 of Figure 5;

Figure 5 is a side elevation of one end of the barrel forming a part of my compressor, and Figure 6 is an end view of the removable cap for closing the end of the compressor through which it is refilled.

Throughout the several views, similar reference characters will be used for referring to similar parts.

Referring to the drawings, my improved compressor comprises the cylindrical barrel 10, which is preferably small in diameter so that the pressure exerted upon the lubricant contained therein will have comparatively high value per unit area. One end of the barrel is closed by the conically shaped cap 11 having the body member 12 formed integrally therewith. This body member is provided with a bore 13 communicating, through the passageway 14, with the space 15 in the cap 11, and in this manner with the barrel 10. A pair of spaced flanges 16 (only one of which is shown) formed integrally with the body member 12, adjacent one end of the bore, provide well known means for establishing connection between the compressor and a fitting of well known construction adapted to be secured to a bearing to be lubricated. A cup leather 17 and a gasket 18, slidably mounted in the bore 13, provide means for sealing the connection between the compressor and a fitting. A compression spring 19, confined between the cup leather 17 and the inner end of the plug 20, yieldingly holds the cup leather 17 in its outermost position. The construction of the coupling member just described is well known to those skilled in this art, forms no part of my present invention, and for that reason will not be described more in detail.

While I prefer to use this particular type of coupling construction in connection with my improved compressor, my invention is not in any way limited to use with a coupling of this particular type.

The end of the barrel 10, opposite the cap 11, is closed by means of the cylindrical cap 21 having a smooth central bore 22, through which the piston rod 23 passes and in which this piston rod is slidably mounted. The open end of the cap 21 is internally threaded, but the threads occupying the spaces A (see Fig. 6) are cut away, leaving only the portions B. The open end of the barrel is externally threaded, and this thread is similarly cut away, leaving the spaces C and the threaded portions D. The spaces C on the barrel are designed to receive the threaded portions B of the cap, so that the cap can be moved substantially to the position shown in Figure 1, and then, by giving it a quarter turn, the threaded portions B of the cap can be brought into complete engagement with the threaded portions D of the barrel, thereby locking the cap to the barrel. The means that I have just described for locking the cap to the barrel are similar to the breech locking means employed in artillery and will hereafter be referred to as breech lock means or mechanism. By employing su . mechanism, it is possible quickly and easily to secure the cap 21 to the barrel 10 in such manner as to withstand very large pressures tending to separate these two elements.

The inner end of the piston rod 23 terminates in a piston that may be of any desired construction, but which is preferably of the construction shown herein or some equivalent thereof. This piston comprises the two heavy disc-shaped rings 24 between which are confined the anti-friction elements 25, the cup leather 26 and face plate 27, all of which are centrally apertured and confined upon the reduced end portion 23' of the piston rod by means of the washer 28 and the nut 27. The outer end of the piston rod 23 is provided with a handle 29 of substantial length to enable the operator easily to rotate the piston rod 23.

For advancing the piston rod when it is rotated by means of the handle 29, I provide a split nut comprising the two halves 30, the inner portions of which are screw threaded, as shown at 31, for co-acting with the external threads of the piston rod. Each half 30 of the split nut is provided with a pair of spaced lugs 32 having aligned openings 33 formed therein for receiving the pivot pins 34. These pins extend transversely of the cap 21 and have their ends anchored in the walls of the latter. The peripheries of the two portions of the split nut are cam-shaped, that is, they taper toward their inner ends, as shown at 35, so as to permit the easy entry of the inner end of the nut into the barrel when the cap is applied thereto. As the cap is moved onto the end of the barrel, the cam-shaped surfaces of the nut will force the two halves toward each other, thereby bringing the threads 31 of the nut into co-acting relation with the threads of the piston rod.

Compression springs 36 are confined between the two halves of the nut, their ends being received in the cup-shaped depressions 37 formed in the opposed faces of the two halves of the nut. When the cap 21 is removed from the barrel 10, these compression springs disengage the two halves of the nut from the piston rod and enable the latter to be moved with reference to the cap 21 until the inner one of the races 24 is brought into substantial contact with the end of the nut. In this manner, all of the parts of the compressor can easily and quickly be brought into the position they must occupy upon the refilling of the barrel 10.

My invention contemplates providing lubricant in the shape of cylindrical rods of substantially the same diameter as the inner diameter of the barrel 10. When the cap 21 is disengaged from the barrel and the associated piston and piston rod are removed therefrom, the operator can insert a rod or stick of lubricant into the barrel and then quickly restore the parts to the position shown in Figure 1, except that the piston will occupy a position adjacent the inner end of the nut.

By means of the construction just described, the operator can very quickly remove the cap, piston and piston rod from the barrel and retract the piston rod in the cap. He can then easily and quickly replace the cap and its associated parts so that the operation of refilling the compressor occupies but very little time. By making the diameter of the barrel comparatively small, it is possible for the operator easily to subject the lubricant to comparatively high pressures. This combination of elements affords a compressor structure that is particularly adapted for the purpose described above, but it should be clearly understood that my compressor can be used for supplying lubricant of more plastic character, or even liquid lubricant, to bearings, and that the novel features of my compressor are of almost equal importance with lubricants of such character.

While I have described the details of construction of the preferred embodiment of my invention, it is to be understood that my invention is not limited to these details, but is capable of other adaptations and modifications within the scope of the appended claims.

Having thus described my invention, what I claim is:

1. A lubricant compressor comprising a barrel having a coupling member rigidly secured to one end, a cap for closing the opposite end of said barrel, said cap and barrel having co-acting breech lock means for detachably securing said cap to said barrel, a threaded piston rod slidably mounted in said cap, a piston carried by the inner end of said piston rod, and a split nut, the parts of said nut being pivotally mounted on said cap and having peripheral cam surfaces for moving said parts into engagement with said piston rod when said cap is attached to said barrel.

2. A lubricant compressor comprising a barrel, a cap for closing the end of said barrel, said cap and barrel having co-acting means for detachably securing said cap to said barrel, a threaded piston rod slidably mounted in said cap, a piston carried by the inner end of said piston rod, and a split nut, the parts of said nut being pivotally mounted on said cap and having cam surfaces for moving said parts into engagement with said piston rod when said cap is attached to said barrel.

3. A lubricant compressor comprising a barrel, a piston rod, a piston in said barrel on the end of said rod, a detachable cap for said barrel, and means carried by said cap and automatically moved by putting said cap in place for establishing a screw threaded connection between said rod and said barrel.

4. A lubricant compressor comprising a barrel, a piston rod, a piston in said barrel on the end of said rod, a quick detachable cap for said barrel, and means carried by said cap and automatically moved by putting said cap in place for establishing a screw threaded connection between said rod and said barrel.

5. In a device of the class described the combination of a barrel for a lubricant compressor, said barrel being externally threaded at its end, a cap having threads complementary to the threads on said barrel, sufficient of the threads of both said cap and barrel being cut away so that the cap may be rotated substantially 90° to disengage said threads and moved axially from said barrel, a piston rod carried by said cap, said piston rod being provided with threads adapted to slide through said cap, a plurality of cam-shaped members carried by said cap and having complementary surfaces to engage the threads on said piston rod, whereby said cam members are cammed into engagement with said piston rod when said cap is placed on said barrel, and resilient means biasing said cam-shaped members from screw thread connection with said piston rod.

6. In a device of the class described the combination of a barrel for a lubricant compressor, said barrel being externally threaded at its end, a cap having threads complementary to the threads on said barrel, sufficient of the threads of both said cap and barrel being cut away so that the cap may be rotated substantially 90° to disengage said threads and moved axially from said barrel, a piston rod carried by said cap, said piston rod being provided with threads adapted to slide through said cap, and a plurality of cam-shaped members carried by said cap and having complementary surfaces to engage the threads on said piston rod, whereby said cam members are cammed into engagement with said piston rod when said cap is placed on said barrel.

In witness whereof, I hereunto subscribe my name this 6th day of June, 1924.

ERNEST W. DAVIS.